US007006135B2

(12) United States Patent
Ishimaru et al.

(10) Patent No.: US 7,006,135 B2
(45) Date of Patent: Feb. 28, 2006

(54) CAMERA CAPABLE OF WHITE BALANCE CORRECTION

(75) Inventors: Toshiaki Ishimaru, Hino (JP); Masataka Ide, Hachioji (JP)

(73) Assignee: Olympus Corporation, Tokyo (JP)

( * ) Notice: Subject to any disclaimer, the term of this patent is extended or adjusted under 35 U.S.C. 154(b) by 724 days.

(21) Appl. No.: 10/068,997

(22) Filed: Feb. 8, 2002

(65) Prior Publication Data

US 2003/0058350 A1   Mar. 27, 2003

(30) Foreign Application Priority Data

Jun. 15, 2001   (JP) .............................. 2001-182012

(51) Int. Cl.
    H04N 9/73         (2006.01)
(52) U.S. Cl. .............................. 348/223.1; 348/223.1; 348/222.1; 348/227.1
(58) Field of Classification Search ............. 348/222.1, 348/223.1, 227.1; 358/516, 518, 519, 520; 382/274, 167
    See application file for complete search history.

(56) References Cited

U.S. PATENT DOCUMENTS

| 5,043,804 | A | * | 8/1991 | Sugiura | 348/226.1 |
|---|---|---|---|---|---|
| 5,319,449 | A | * | 6/1994 | Saito et al. | 348/223.1 |
| 5,337,152 | A | * | 8/1994 | Kotaki | 348/234 |
| 5,526,048 | A | * | 6/1996 | Yamamoto | 348/223.1 |
| 5,659,357 | A | * | 8/1997 | Miyano | 348/223.1 |
| 5,691,772 | A | * | 11/1997 | Suzuki | 348/223.1 |
| 5,732,293 | A | * | 3/1998 | Nonaka et al. | 396/157 |
| 5,751,354 | A | * | 5/1998 | Suzuki et al. | 348/349 |
| 6,160,581 | A | * | 12/2000 | Higashihara et al. | 348/364 |
| 6,363,220 | B1 | * | 3/2002 | Ide | 396/98 |
| 6,573,932 | B1 | * | 6/2003 | Adams et al. | 348/224.1 |
| 6,727,942 | B1 | * | 4/2004 | Miyano | 348/223.1 |
| 6,791,606 | B1 | * | 9/2004 | Miyano | 348/223.1 |
| 2001/0007470 | A1 | * | 7/2001 | Haavisto | 348/223 |
| 2002/0027601 | A1 | * | 3/2002 | Nakayama et al. | 348/223 |
| 2002/0113881 | A1 | * | 8/2002 | Funston et al. | 348/223 |

FOREIGN PATENT DOCUMENTS

| JP | 5-7369 | | 1/1993 |
|---|---|---|---|
| JP | 9-90459 | | 4/1997 |
| JP | 2000266988 | A * | 9/2000 |

* cited by examiner

*Primary Examiner*—Thai Tran
*Assistant Examiner*—Nelson D. Hernandez
(74) *Attorney, Agent, or Firm*—Straub & Pokotylo; John C. Pokotylo

(57) ABSTRACT

A camera capable of white balance correction (WBC) of this invention has an image pickup optical system, an image sensor for receiving light from an object, a three-primary-color (3-color) detection section for detecting 3-color signals based on the image sensor output, a matrix processing section for calculating 2-color difference signals from the 3-color signals, a visible-light brightness detection section for detecting visible-light brightness by the output from the 3-color detection section or by a photometric section, an infrared-light detection section for detecting the lightness of infrared-light, and an artificial-light detection section for calculating the ratio of artificial light and natural-light. A correction range for performing the WBC is obtained based on the ratio of artificial-light and natural-light computed by the artificial-light detection section, and the WBC is performed when the 2-color difference signals are within the correction range.

7 Claims, 16 Drawing Sheets

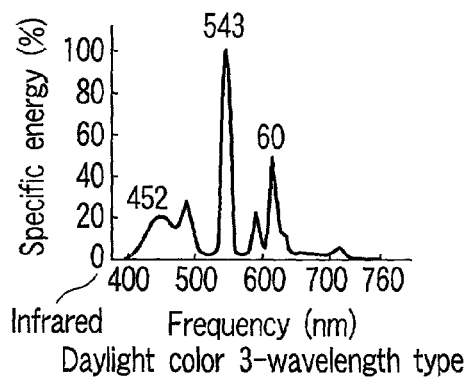
F I G. 4A
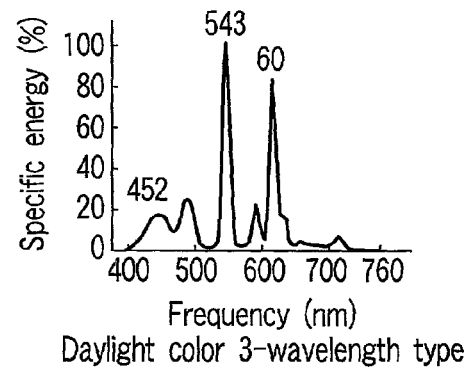
F I G. 4C
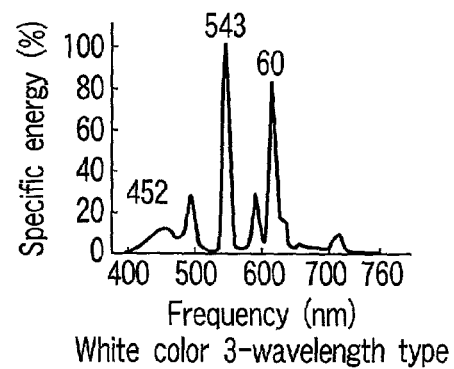
F I G. 4E

100:1
(under fluorescent lamp)

100:21
(under sunlight)

100:160
(under electric lamp)

CAMERA CAPABLE OF WHITE BALANCE CORRECTION

CROSS-REFERENCE TO RELATED APPLICATIONS

This application is based upon and claims the benefit of priority from the prior Japanese Patent Application No. 2001-182012, filed Jun. 15, 2001, the entire contents of which are incorporated herein by reference.

BACKGROUND OF THE INVENTION

1. Field of the Invention

The present invention relates to color balance, more particularly, white balance in a digital camera (electronic camera).

2. Description of Related Art

As for the prior art concerning white balance, a method of white balance has been proposed in Jpn. Pat. Appln. KOKAI Publication No. 5-7369. Conventionally, for a video camera or still camera, the control processing of white balance has been performed assuming that an "achromatic color (for example, gray) can be obtained by averaging the whole image". However, a problem occurs that the color reproducibility of an object illuminated with a fluorescent lamp can not be improved totally by such processing. The following solutions have been proposed to solve this problem. Namely, it is determined whether a camera is located outdoors or indoors, according to a brightness higher or lower that a predetermined brightness (Y), and if it is indoors, the kind of light source is identified according to a value of a white balance control signal (R CONT, B CONT) that would make a value of a color-difference signal (R–Y, B–Y) equal to a reference value. Then, the color reproducibility is improved through modification of magnification of a primary red signal R and a primary blue signal B, by limiting the magnification of these primary red signal R and primary blue signal B, according to the identified kind of light source. Therefore, the countermeasure as mentioned above permits preventing inconveniences due to excessive correction, for example, discoloration of the background, or excessive correction of colors of the main object.

Moreover, there is a white balance control method as taught in Jpn. Pat. Appln. KOKAI Publication No. 9-90459. Here is proposed to discriminate artificial light/natural light based on the balance of visible light photometric value and infrared light photometric value (in short, ratio of visible light component and infrared light) and to emit light from an electric flash device according to the ratio of the visible light component and infrared light, as processing for correction (mixed light correction) of color balance on a photographic print due to the color mixture by a fluorescent lamp or electric lamp.

It has been possible to correct the color balance, and improve somewhat the color reproducibility by using such prior art.

However, in said Jpn. Pat. Appln. KOKAI Publication No. 5-7369, though the kind of light source is determined according to the value of the white balance control signals R CONT and B CONT that would make the value of the color-difference signals R–Y and B–Y equal to a reference value, after all, it is determined by the ratio of values of R, B and Y, the kind of light source might be determined inaccurately and the correction becomes insufficient or excessive according to the actual color of the object.

On the other hand, in said Jpn. Pat. Appln. KOKAI Publication No. 9-90459, though the kind of light source is determined based on the visible light photometric value and the infrared light photometric value, the color is simply improved by emitting light from an electric flash device when the light source is determined to be artificial, and there is no reference to the digital color signals R, G and B. Besides, in case of this conventional example, as a result of determination of the light source kind, there is nothing but a straight choice between emitting/non-emitting the electric flash device, and there is no other option than emitting/non-emitting even in the case of a slight color mixture as, for example, by a window under a fluorescent lamp, and a further fine correction appropriate for such a situation is impossible. Therefore, a camera that can correct "color mixture" even at a window side under an artificial light source is required.

It is an object of the present invention to provide a camera, such as a digital camera, capable of white balance correction that would correct the color mixture of an artificial light from a light source, in the case where the light source is determined to be artificial based on a visible light photometric value and an infrared light photometric value.

BRIEF SUMMARY OF THE INVENTION

In order to solve the problems and achieve the object, the present invention takes the following measures (improvements). Namely, according to a first aspect, there is proposed a camera capable of white balance correction comprising: an image pickup optical system; an image sensor for receiving light from an object through the image pickup optical system; a three-primary-color detection section for detecting three-primary-color signals based on the output of the image sensor; a matrix processing section for calculating two color difference signals from the three-primary-color signals; a visible light brightness detection section for detecting visible light brightness by the output from the three-primary-color detection section or by a photometric section having as an automatic camera; an infrared light detection section for detecting the luminosity of infrared light; and an artificial light detection section for calculating the ratio of artificial light and natural light from the output of the visible light brightness detection section and the output of the infrared light detection section, wherein a correction range for performing the white balance correction is determined based on the ratio of artificial light and natural light computed by the artificial light detection section, and the white balance correction is performed when the two color difference signals are within the correction range.

Then, there is proposed a camera capable of white balance correction according to the first aspect further comprising: a determining section for determining the kind of artificial light source from the two color difference signals, and a correspondence section for calculating a correction limit value to make correspondence based on the determination result of the kind of artificial light source, wherein the quantity of white balance correction of the two color difference signals is limited by the correction limit value.

In addition, there is proposed a camera capable of white balance correction according to the first aspect, wherein the infrared light detection section can also be used as a remote control light detection section for detecting a light emitted from a remote controller for remote-controlling the camera.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the embodiment given below, serve to explain the principles of the invention.

FIG. 4A to FIG. 4F are graphs showing wavelength distributions of new and old fluorescent lamps, FIG. 4A, FIG. 4C and FIG. 4E being graphics showing the wavelength distribution characteristics of recent three wavelength type fluorescent lamps, and FIG. 4B, FIG. 4D and FIG. 4F graphics showing the wavelength distribution characteristics of conventional three wavelength type fluorescent lamps;

FIG. 5A being a graph showing the spectral sensitivity of an ordinary CCD camera (sensitivity of CCD) and FIG. 5B a graphic showing the spectral sensitivity of a recent quadri-section pixel (RGB sensor);

FIG. 12B a graphic showing the spectral sensitivity ratio of a visible light sensor and an infrared sensor under a fluorescent lamp, FIG. 12C a graphic showing the spectral sensitivity ratio of a visible light sensor and an infrared sensor under sunlight, and FIG. 12D a graphic showing the spectral sensitivity ratio of a visible light sensor and an infrared sensor under an electric lamp;

DETAILED DESCRIPTION OF THE INVENTION

Now, the present invention will be described in detail citing specific embodiments hereinafter.

It will be described taking an example of a camera as one embodiment according to the present invention, based on FIG. 1 to FIG. 12D.

Figure 1:
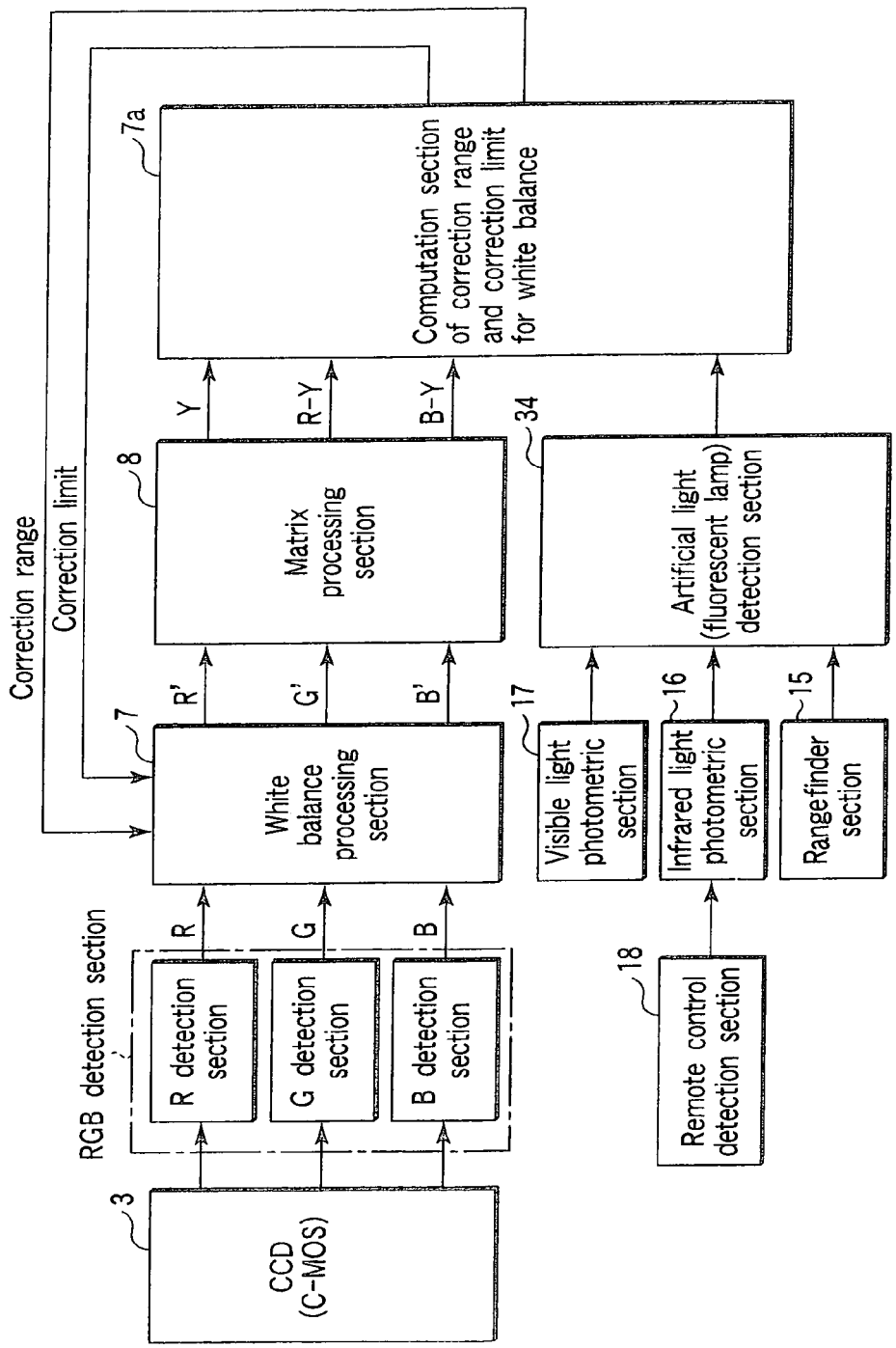
FIG. 1 is a schematic configuration diagram of a camera capable of white balance correction of an embodiment of the present invention.

FIG. 1 shows a schematic configuration of a camera capable of white balance correction of the present invention. Except for an image pickup optical system and a control section (not shown), this camera is composed of the following components. Namely, it comprises an image sensor 3 for picking up an image through the image pickup optical system, and an RGB detection section (4, 5, 6) for detecting R, G, and B signals of three primary colors from this image sensor 3. Moreover, the camera further comprises: a matrix processing section 8 for calculating one brightness signal Y and two color difference signals R−Y and B−Y from the R, G, and B signals; a visible light photometric section 17 serving as a visible light brightness detection section for detecting the output from the RGB detection section, or the visible light brightness by one of a plurality of photometric sections (16, 17) provided ordinarily in a camera; an infrared light photometric section 16 serving as means of infrared detection for detecting the luminosity of infrared light; and an artificial light detection section 34 for calculating the ratio of artificial light and natural light, as measure representing the "artificial light source likeliness" from the output of the visible light brightness detection section and the output from the infrared light photometric section 16.

This camera is an electronic camera capable of white balance correction, configured to determine a correction range for correcting the white balance in the ratio of artificial light and natural light thereof, based on a method described in detail hereinafter, and to perform predetermined white balance correction when two kinds of color difference signals (R−Y, B−Y) are in the correction range.

In the camera capable of white balance correction of the configuration as mentioned above, it is configured to perform the following processing. In short, for example, the output of the image sensor 3 comprising CCD or C-MOS sensor is input respectively in the RGB detection section (4, 5, 6), and R (Red), G (Green), and B (Blue) signals corresponding to three primary colors are outputs. The R, G, and B signals are corrected by the white balance processing section 7, and color signals R', G', and B' signals after correction enter the matrix processing section 8. Then, a Y signal which is a light intensity signal, and two color signals (R−Y) and (B−Y) based on the same, are determined by the matrix processing section 8 based on the color signals R', G', and B' signals.

The artificial light detection section 34 is for determining according to procedures mentioned in detail hereinafter whether the photographing environment is under artificial light such as fluorescent lamp, for example, or under sunlight (natural light), on the basis of the output of the visible light photometric section 17 composed of a well-known image sensor or other photometric device, the output of the infrared light photometric section 16 for measuring the lightness of infrared light, and the output of a rangefinder section 15.

Then, a correction range of white balance for obtaining color signals (R−Y)/Y and (B−Y)Y based on the output of this artificial light detection section 34, and outputs Y, (R−Y) and (B−Y) of the matrix processing section 8, a correction range for white balance and a correction limit value are calculated in a correction limit calculation section 7a. Then, such a configuration is employed that an optimal white balance correction is executed, through the feedback of the correction range and correction limit value concerning this correction to the aforementioned white balance processing section 7.

In short, in this camera, the brightness of visible light is detected by the visible light brightness detection section 17, while the lightness of infrared light is detected by the infrared light photometric section 16. Then, as the kind of light source can be determined based on the ratio of artificial light and natural light calculated by the artificial light detection section 34 based on these outputs, the correction range for white balance correction can be determined based on this ratio.

Thus, in this embodiment, as a determination is made about the light source is artificial light or not on the basis of the brightness of visible light and infrared light lightness but not the tint (mixed color of pure color and achromatic color), there will be no more inaccurate determination for a subtle tint of an object. As much, it can be determined to be a fluorescent lamp or electric lamp or the like with a higher probability, allowing setting of a larger range for performing the white balance correction (in short, correction range for white balance) of that moment.

Besides, as the correction limit value is calculated based on the output from the artificial light detection section 34 and the color signals (R−Y)/Y and (B−Y)/Y, the higher is the "fluorescent lamp likeliness", the lager becomes the correction, and if it is not likely to be a fluorescent lamp, it is less corrected, the white balance can be performed more securely as necessary.

Figure 2:
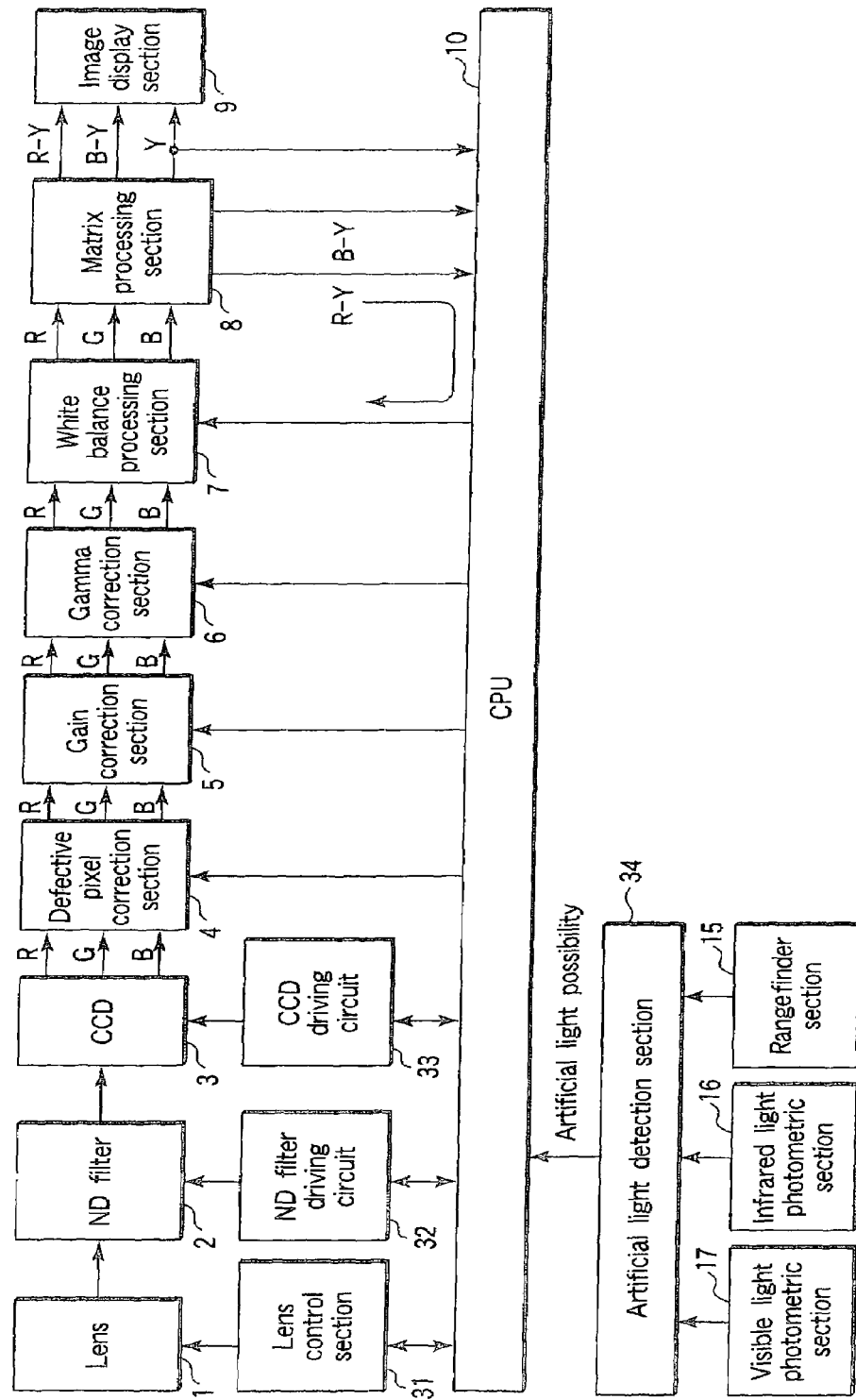
FIG. 2 is a detailed circuit block diagram of the configuration of the camera illustrated in FIG. 1.

FIG. 2 shows the configuration of the camera illustrated in FIG. 1 with a further detailed circuit block diagram. In short, the camera illustrated as this embodiment has components as shown. In short, an image pickup optical system comprising a lens 1 and a ND filter 2, and an image sensor 3 made of a CCD or the like receiving light reflected from an object through this image pickup optical system are provided in a prior stage of this system. Following this prior state, an RGB detection section made of a deficient pixel correction section 4, a gain control section 5 and a gamma correction section 6, for detecting R, G, and B signals corresponding to three primary colors from the image sensor 3, a matrix processing section 8 for calculating brightness signals Y, color difference signals R−Y and B−Y from the R, G, and B signals, and an image display section 9 for image display are provided in a latter stage.

The lens 1 is controlled by a lens control section 31, the ND filter 2 is controlled by an ND filter driving circuit 32, the CCD of the image sensor 3 is controllably connected by a CCD driving circuit 33, and a CPU 10 serving as a control section for supervising and controlling whole the camera controllably connect the components 4 to 8 and 31 to 33 as illustrated. Then, in this camera, such a configuration is employed that predetermined white balance correction is performed when the color difference signals R−Y and B−Y are within the correction range and a picture image to which appropriate white balance is performed is obtained, according to the control of the CPU 10.

Figure 3:
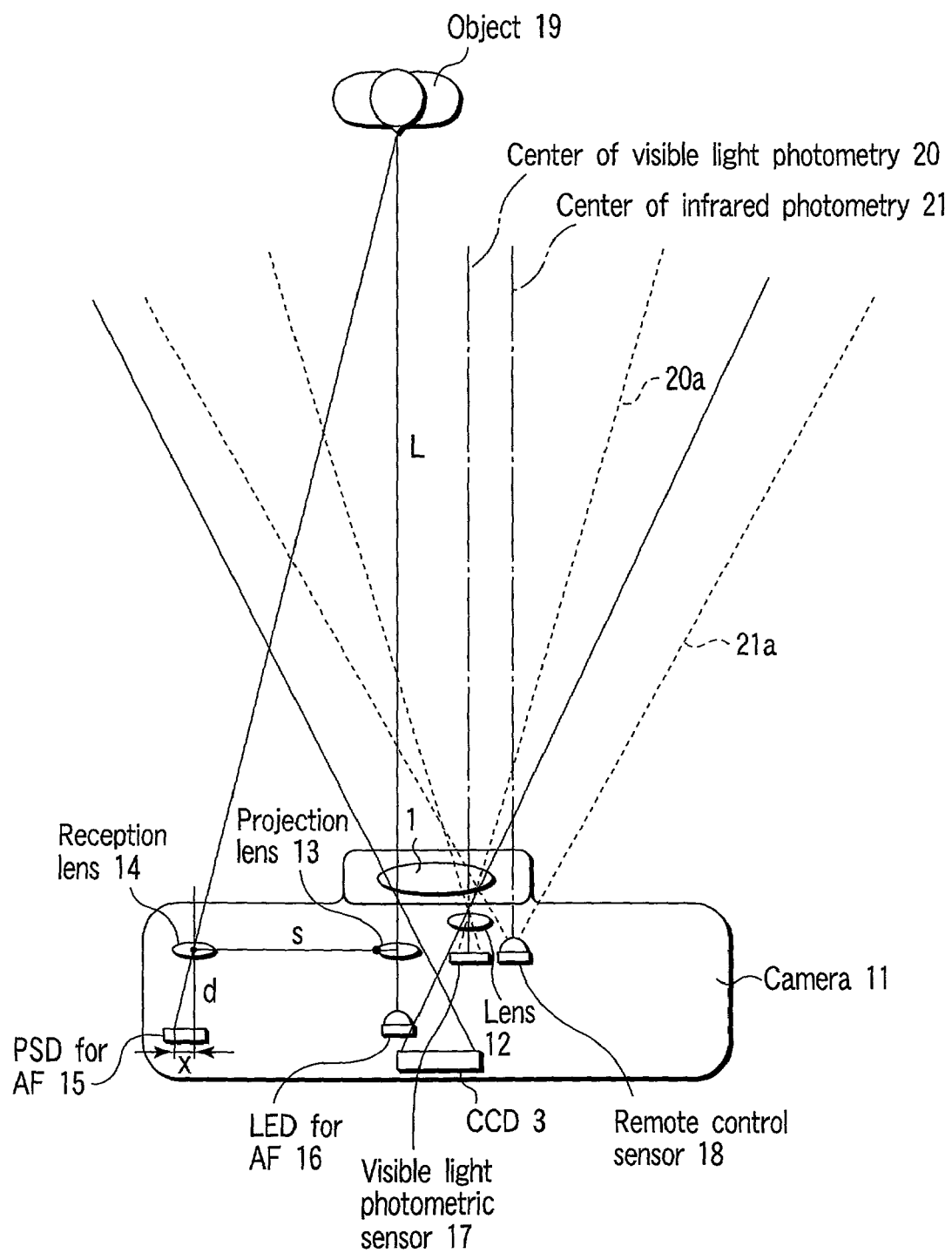
FIG. 3 is an illustrative diagram showing a mechanism for photometry and rangefinding of an object by this camera.

FIG. 3 shows a mechanism for photometry and rangefinding of an object performed by the camera of this embodiment illustratively. This camera is an AF camera that can be operated at distance through a remote control apparatus (not shown).

In the body of this camera 11, for photometry and rangefinding of an object 19, in addition to a camera CCD, a visible light photometric sensor as visible light photometric section 17, an infra red light photometric sensor (remote control sensor) as infrared light photometric section 18, and various lenses for AF and AF optical system are disposed.

A median line 20 for photometry by visible light and a photometry range 20a thereof, and a median line 21 for photometry by infrared light and a photometry range 21a thereof are set so that the object can be included sufficiently as illustrated. The infrared light reception range for a remote control sensor is also set supposing that it is operated at distance mainly forward including the object.

Here, the characteristics of the aforementioned artificial light (for example, a fluorescent lamp) will be described briefly.

Figure 4B:
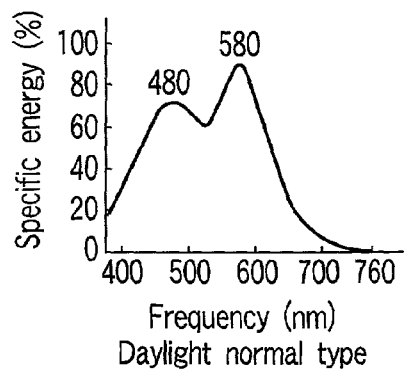
Figure 4D:
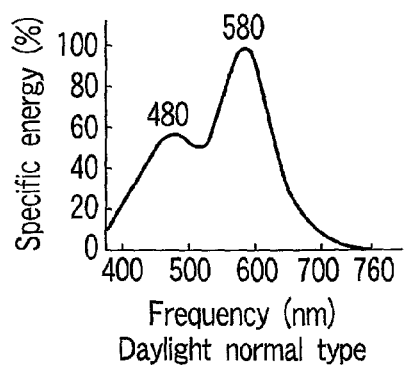
Figure 4F:
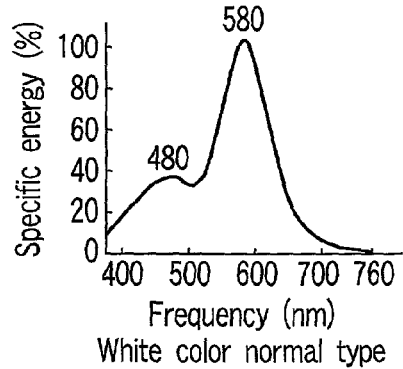

FIG. 4A to FIG. 4F show wavelength distributions of new and old fluorescent lamps in a comparison manner, and as graphs shown respectively in FIG. 4B, FIG. 4D and FIG. 4F, in case of any type of fluorescent lamp among conventional type fluorescent lamps (daylight color normal type, day white color normal type, white color normal type), they have been manufactured with a setting such that the eye perceives lightness equal or more than the illuminance, by increasing the light quantity near 560 nm where the human eye luminosity is high, by setting so that it would become a peak. Recently, as shown respectively in FIG. 4A, FIG. 4C and FIG. 4E, three wavelength type fluorescent lamps (daylight color three wavelength type, day white color three wavelength type, white color three wavelength type) of the characteristics three peaks of 452 nm, 543 nm and 611 nm are provided, and an improvement has been made so that the eye perceives lightness equal or more than the illuminance, by increasing relatively the illuminance in the vicinity of the peak of sensitivity of three kinds of cone (for example, L cone, M cone, S cone) that are human eye light receptor cells.

Ordinarily, the human eye is provided with an effect (chromatic adaptation) for adjusting the sensitivity of cones so as to maintain a view of colors under the daylight, when we stay under various light source for a certain time. Consequently, we seldom feel that something is different, even when a light source is "greenish" under a fluorescent lamp.

On the other hand, for an image sensor such as CCD, nothing like as chromatic adaptation takes place, colors according to the kind of light source are measured as they are.

For example, depending on the kind of fluorescent lamp, in general, colors become greenish with a fluorescent lamp.

When a human face becomes greenish: therefore, portrait photography requires correction particularly.

Figure 5A:
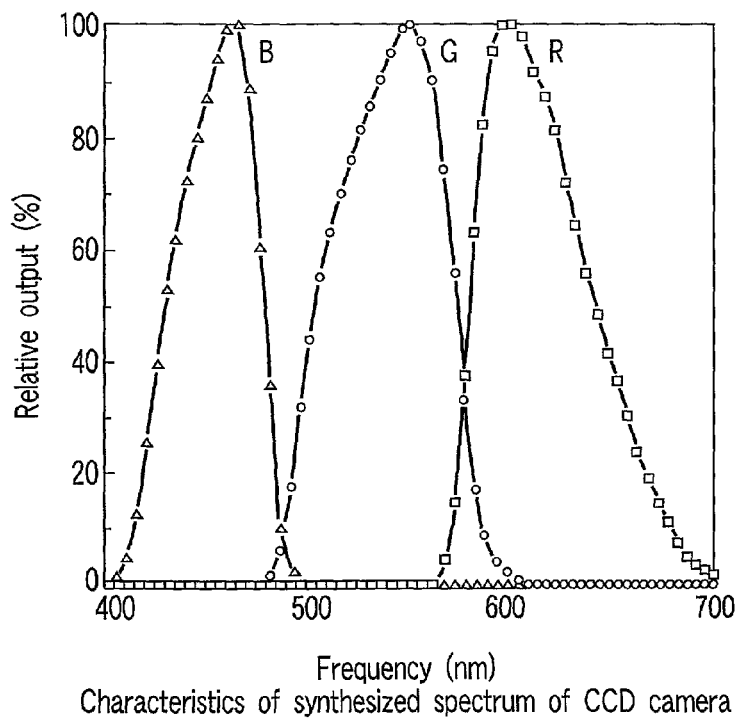
FIG. 5A and FIG. 5B indicate the spectral sensitivity of a CCD camera.
Figure 5B:
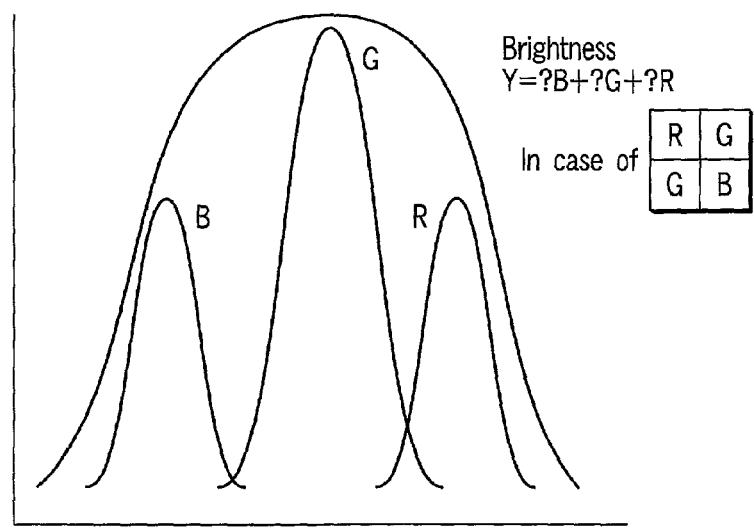

Consequently, a camera served for object photographing under such a fluorescent lamp needs to be provided with a sensor having a sensitivity appropriate for the characteristics as illumination light. For example, the spectral sensitivity of an ordinary CCD camera (in short, CCD sensitivity) has been of a level where the sensitivity (namely, relative output) for three primary colors (R, G, B) as shown in FIG. 5A is substantially equal. However, some of spectral sensitivities of resent quadrisection pixel (namely, RGB sensor), area ratio of respective sensors for R, for G and for B being 1:2:1, are provided with a sensitivity similar to the characteristics of three wavelength type fluorescent lamp forming three chevrons likely to be sensitive to G (green). In this embodiment also, this sensor is applied.

Figure 6A:
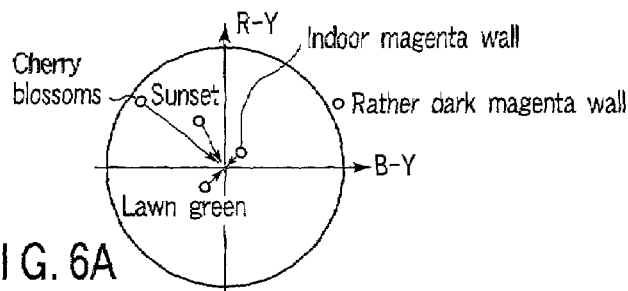
FIG. 6A to FIG. 6C show the comparison of white balance of the prior art and the present invention for different photographing situation, FIG. 6A and FIG. 6B being a graphic showing a method of white balance of the prior art and FIG. 6C a graphic showing a method of white balance of this embodiment.
Figure 6B:
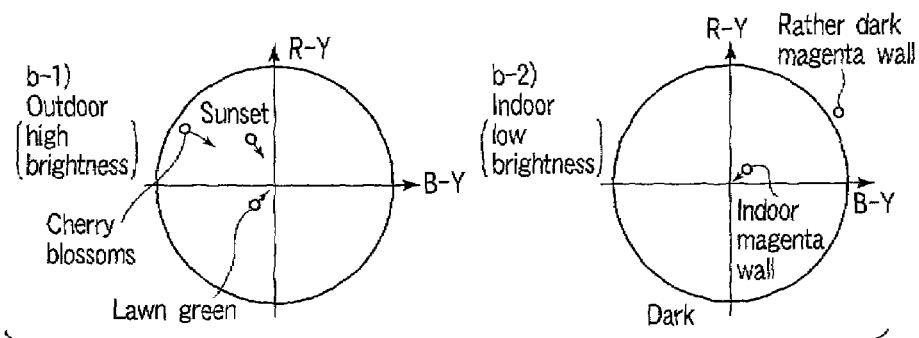
Figure 6C:
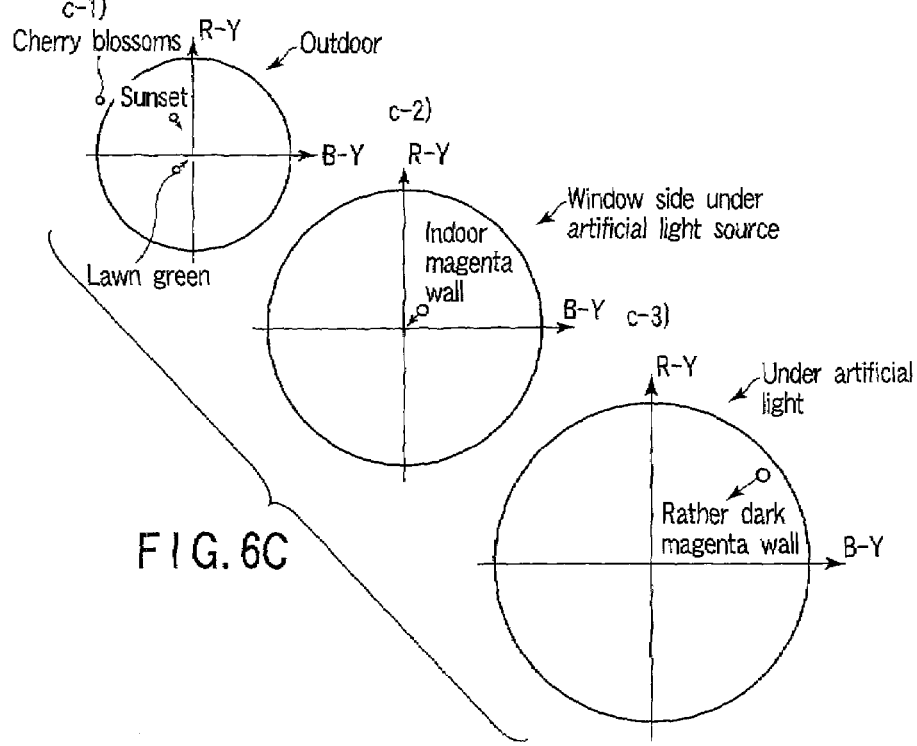

Furthermore, the comparison of white balance of the prior art and the present invention, for different photographing situations and objects, are shown in FIG. 6A to FIG. 6C.

In case of obtaining brightness signal Y, color difference signal color signals B−Y and R−Y from three primary colors R, G, and B, outputs of a CCD, if color signals of R, G, and B are based on the photoelectric conversion characteristics defined in "CCIR Recommendation 709 (ITU-R Recommendation BT. 709)", they can be determined by the following expression:

$$Y = 0.229R + 0.587G + 0.114B$$

$$B-Y = -0.299R - 0.587G + 0.886B$$

$$R-Y = 0.701R - 0.587G - 0.114B$$

The ratio of sensitivity of cones having sensitivity of R, G, and B being 0.299: 0.587: 0.886, Y is the total of sensitivity of three cones (refer to the aforementioned respective expressions), and represents a brightness signal which is light intensity felt by the eye.

As three primary colors R, G, and B are equal for an achromatic color (gray), assuming R=G=B=p, $$B - Y = -0.299R - 0.587G + 0.886B$$
$$= -0.299p - 0.587p + 0.886B = 0$$
$$R - Y = 0.701R - 0.587G - 0.114B$$
$$= 0.701p - 0.587p - 0.114p = 0$$

thereby making color differences B−Y and R−Y zero (0) for the achromatic color.

A conventional method for performing the white balance assuming that an "achromatic color (gray) can be obtained by averaging the whole image" as shown in FIG. 6A.

On the contrary, the correction is rather harmful except when B−Y and R−Y are in the achromatic color vicinity (vicinity represented by an circle in the drawing), because there is every possibility that the object itself has colors. However, as there is every possibility of discrepancy by the color at the light source in the achromatic color vicinity (in the area of the circle), correction is applied to B and R so that B−Y and R−Y become 0 (zero) respectively.

In addition, FIG. 6B shows a method taught in Jpn. Pat. Appln. KOKAI Publication No. 5-7369 as an example of the prior art. Here, it is determined whether the obtained brightness is high brightness or low brightness and the photographing environment is outdoors or indoors (in the room) and the correction quantity is limited respectively.

In contrast of these prior arts, FIG. 6C shows a method of white balance to be adopted for this embodiment. In short, the "artificial light likeliness" is determined according to the infrared and visible light brightness, and object distance, and the range itself for determination of achromatic color is changed according to the "artificial light likeliness". To be more specific, c-1) When it is determined outdoor (visible light≈infrared light), the circle represented by a pie chart is shown relatively small, as the degree of color mixture at the light source is small.

c-2) At the window side under an artificial light source (visible light> infrared light), it is represented by a circle larger than the outdoor.

c-3) Under the artificial light source (visible light>> infrared light), the range is made large, as the degree of color mixture by the fluorescent lamp or electric lamp is large. Nonetheless, it is unnecessary to make it circular, but the range thereof is enlarged as necessary so as to include the object under the artificial light source.

As the fluorescent lamp is determined according to the ratio of visible light and infrared light, the color of the object does not cause error of determination, and the reliability of determination is high, allowing to optimize securely the achromatic color range according to the "artificial light source likeliness".

For example, in case of photographing full-blown cherry blossoms, the method of FIG. 6A corrects to an achromatic color and the correction is excessive, while the method of FIG. 6B controls the correction quantity by a limit, but unnecessary correction might be applied. On the other hand, the method of FIG. 6A of the present invention does not apply an unnecessary correction as the range is narrow outdoors.

For example, the correction is not applied to a rather dark magenta wall in the methods of FIG. 6A and FIG. 6B, but the correction is performed moderately in the method of FIG. 6C.

Figure 7:
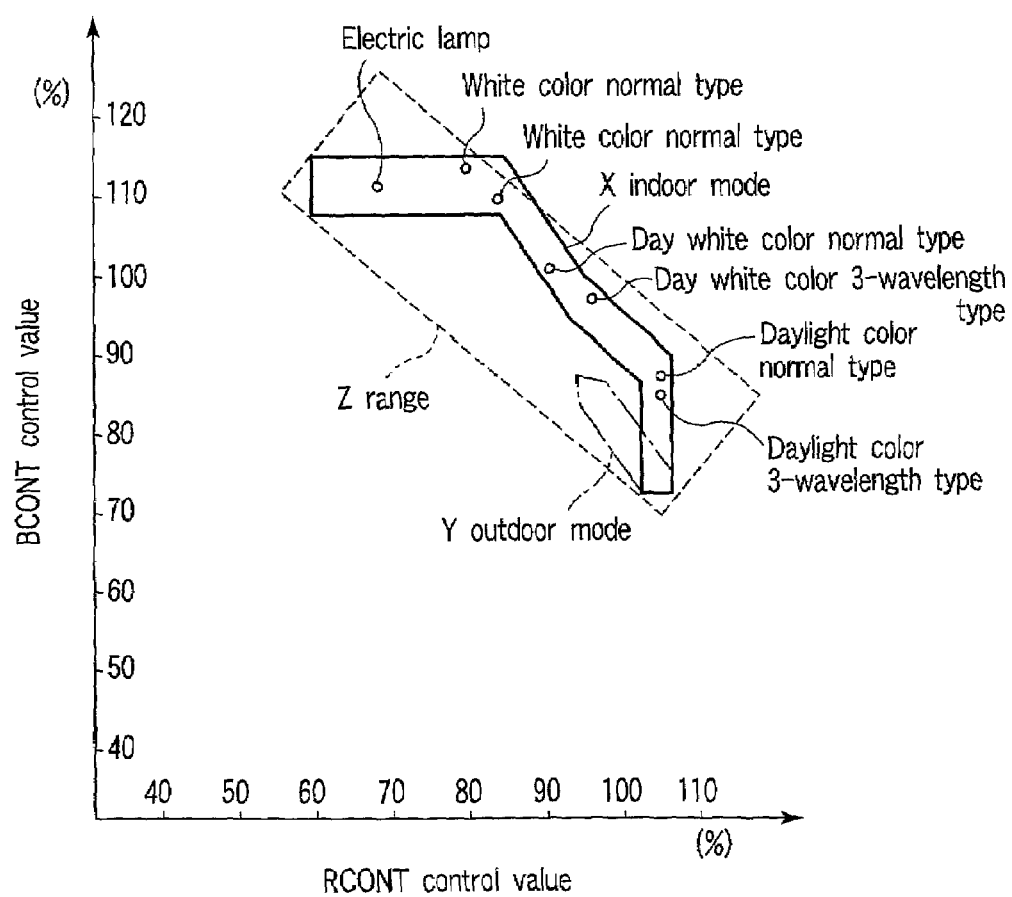
FIG. 7 is a graph showing the control value range concerning the limit of correction in the prior art (Jpn. Pat. Appln. KOKAI Publication No. 5-7369)

FIG. 7 shows a control value range concerning the limit of correction in the prior art (Jpn. Pat. Appln. KOKAI Publication No. 5-7369). In short, the correction is controlled to such a range (solid line) corresponding to all kinds of fluorescent lamp. R CONT as a control value is a coefficient to multiply the R signal to make it achromatic, while B CONT is a coefficient to multiply the B signal to make it achromatic.

It should be appreciated that, in the Z range surrounded by a broken line, the correction quantity is large to prevent lack of correction, as there is no determination of outdoors or indoors, and a correction limit is applied uniformly. This corresponds to the object shown in FIG. 6A.

On the other hand, X indoor mode and Y outdoor mode are respectively modes for changing the limit range of correction according to outdoors or indoors and correspond to FIG. 6B.

Figure 8:
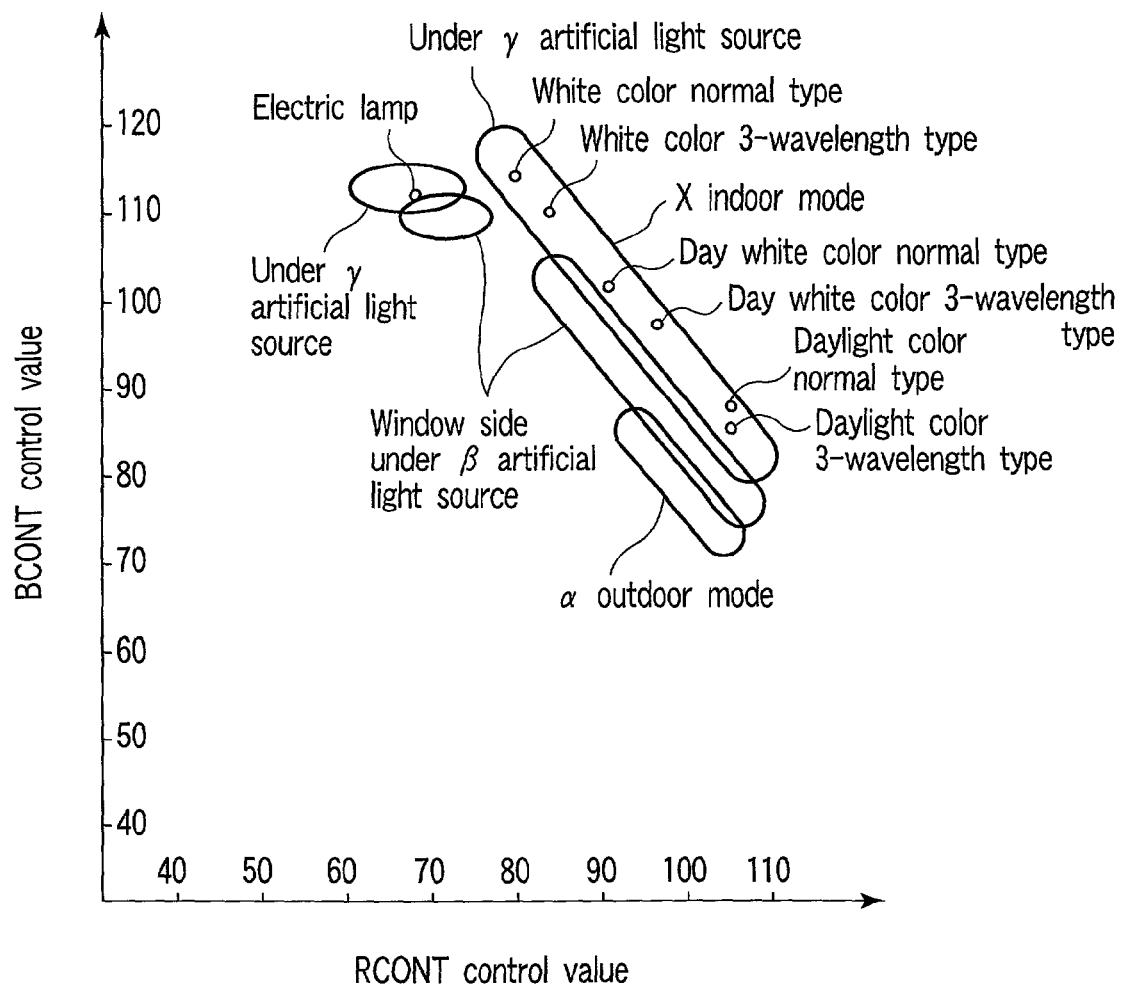
FIG. 8 is a graph showing the control value range concerning the limit of correction in this embodiment.

FIG. 8 shows the control value range concerning the limit of correction in this embodiment. The range of control values R CONT and B CONT are not continuous as mentioned above. In short, the range α is a limit range of correction for outdoors and corresponds to c-1) of FIG. 6. The range β is a limit range of correction for window side under the artificial light source and corresponds to c-2) of FIG. 6. The range γ is a limit range of correction under the artificial light source and corresponds to c-3) of FIG. 6.

It should be appreciated that this embodiment divides into three ways with the artificial light source likeliness, but further more case divisions may be performed. However, as light of the electric lamp rather creates an ambiance with a "reddish" color, it will not be corrected in the present invention.

Figure 9:
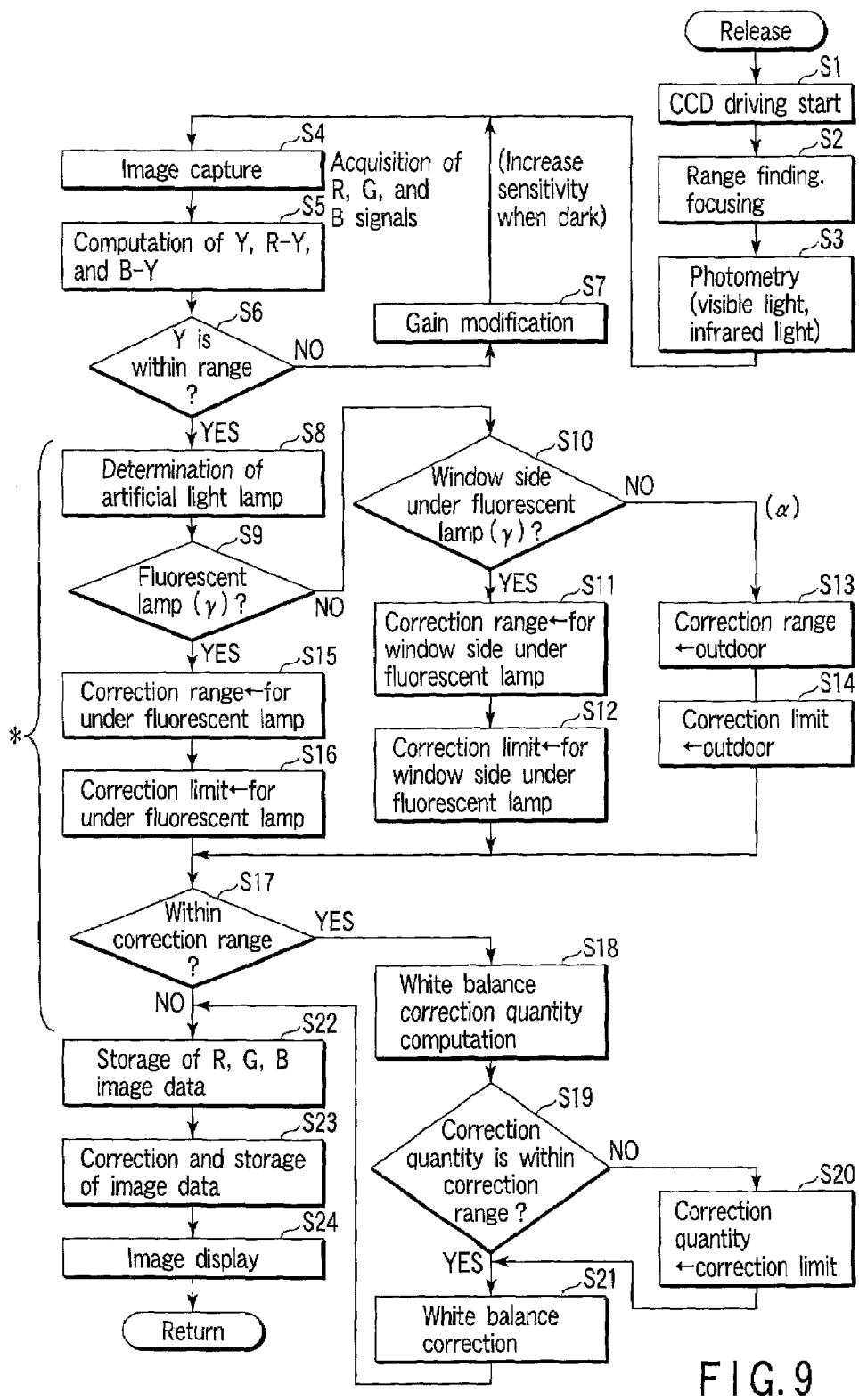
FIG. 9 is a flowchart representing the operation control procedures of the camera of this embodiment.

Now, the operation control of the camera of this embodiment will be described in FIG. 9 and FIG. 10. First, the flowchart shown in FIG. 9 shows about the actions from the release operation. First, the driving of the CCD 3 is started (S1), the distance is measured by the rang finder section 15, and the obtained distance is brought into focus (S2). Thereafter, a photometry concerning both of visible light and infrared is performed respectively in each photometry section 16, 17 (S3).

In step S4, a picture image (R, G, B signals) of an object is captured by the CCD 3 (S4).

In the matrix processing section 8, brightness signal (Y), color difference signals (R-Y, B-Y) are calculated form these R, G, and B signals (S5).

In step S6, it is determined whether or not the brightness signal (Y) is a value within a predetermined value (visible light brightness of 2 or more), and in the case of no, the sensitivity is increased if it is dark (S7), it returns to the aforementioned step S4, and the image is captured again.

In case of within the predetermined range, in a step S8, (kind) determination of artificial light (fluorescent lamp or the like) is made by calling a sub-routine (S8) and, particularly in determination of fluorescent lamp or not (S9), in the case of no, it is determined, for example, whether or not a window side under the fluorescent lamp including natural light (S10), and in the case of no, it shifts to step 13.

It should be appreciated that a correction range for correcting the white balance based on the ratio of artificial light and natural light is required to be established (set). There, if it is under the fluorescent lamp and by the window, values for the time when it is under the fluorescent lamp and, at the same time, by the window are set respectively as correction range and correction limit (S11, S12), before shifting to step S17.

If it is not the window side, it is determined to be outdoors, and values for the time of outdoors are set respectively for correction range and correction limit (S13, S14) and it shift to step S17.

In the aforementioned step S9, if it is determined to be under the fluorescence, values for the time under the fluorescent lamp are set respectively for correction range and correction limit (S15, S16). Then, in the step S17, it is determined whether or not it is within the set correction range (S17), it shifts to step S22 in the case of no, but it shifts to step S18 in case of within the range, and the correction quantity of white balance is calculated (S18). It is determined whether or not this correction quantity is within the correction limit (S19), and in the case of no, the correction limit is set to that correction quantity (S20), before performing the predetermined white balance correction (S21).

From the step S22, R, G, B image data is stored (S22), the image date compression and storage are performed (S23), image display is performed (S24) and it returns to a predetermined camera sequence routine (not shown).

Figure 10:
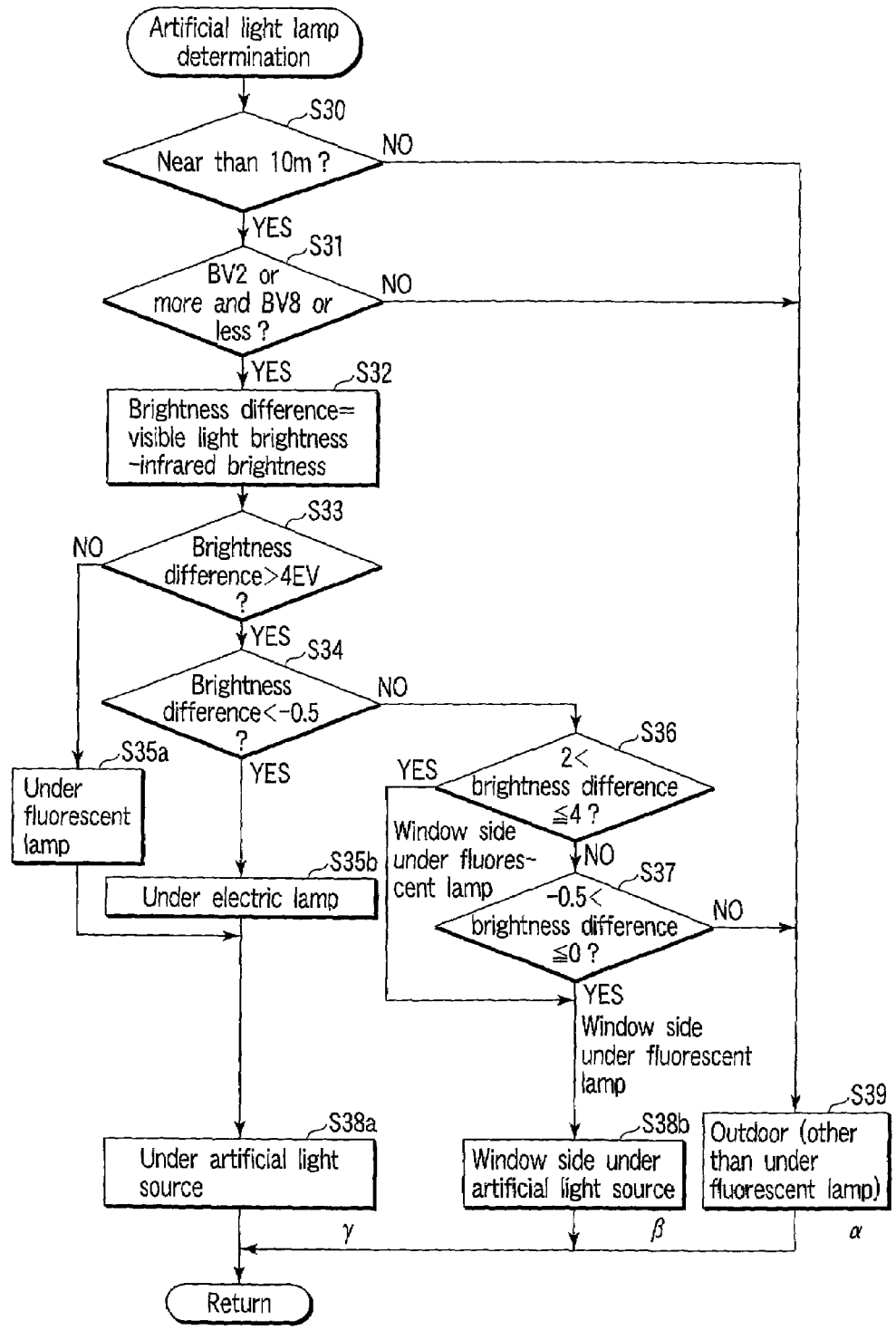
FIG. 10 is a flowchart representing procedures of a routine "artificial light determination"

Further, FIG. 10 shows a flowchart of a routine "artificial light (fluorescent lamp) determination" called in the step S8 of FIG. 9 mentioned above.

If the rangefinding result is farer than 10 m, it is determined to be outside (S30), if the brightness is not BV2 to BV8, it is determined to be outside (S31), it shifts to a step S39, and an α representing being outdoors is set (S39) before return.

Here, as the brightness is the one corresponding to the human luminosity, it can not be said precise to qualify the lightness of infrared light as "brightness". However, lightness of infrared light corresponding to the sensitivity of an infrared light sensor is represented here as "infrared brightness (brightness of infrared ray)".

It is assumed to be outdoor if the brightness difference is 0EV or more and 2EV or less, and it is determined to be under the fluorescent lamp if more than 4EV, but it can be determined to be indoor window side under the fluorescent lamp between them (2EV to 4EV).

If the result of determination of the aforementioned step S31 is under the fluorescent lamp, the brightness difference (visible light brightness infrared-brightness) is calculated (S32).

In step S33, it is decided whether or not the brightness difference is more than 4EV (S33), and it is determined to be under the fluorescent lamp if it is more than 4EV (S35a). On the other hand, in the case of no, it is further decided whether or not the brightness difference is -0.5EV (S34), and it is determined to be under an electric lamp if it is more than -0.5EV (S35b). Then, as under the fluorescent lamp and under the electric lamp are under the artificial light source, a γ representing the same is set (S38a) before return.

On the other hand, in case where the decision result of the aforementioned step S34 is negative, in step S36, it is decided whether or not the brightness difference is more than 2EV and 4EV or less (S36), it is determined to be window side under the artificial light source if it is the case and it shifts to step S38b. However, in the case of no, it is further decided whether or not it is more than -0.5EV and 0EV or less (S37), and if it is the case, a β representing that it is under the artificial light source is set in the step S38b (S38B) before return.

Otherwise (other than under the fluorescent lamp), it shifts to the aforementioned step S39, before return.

Figure 11:
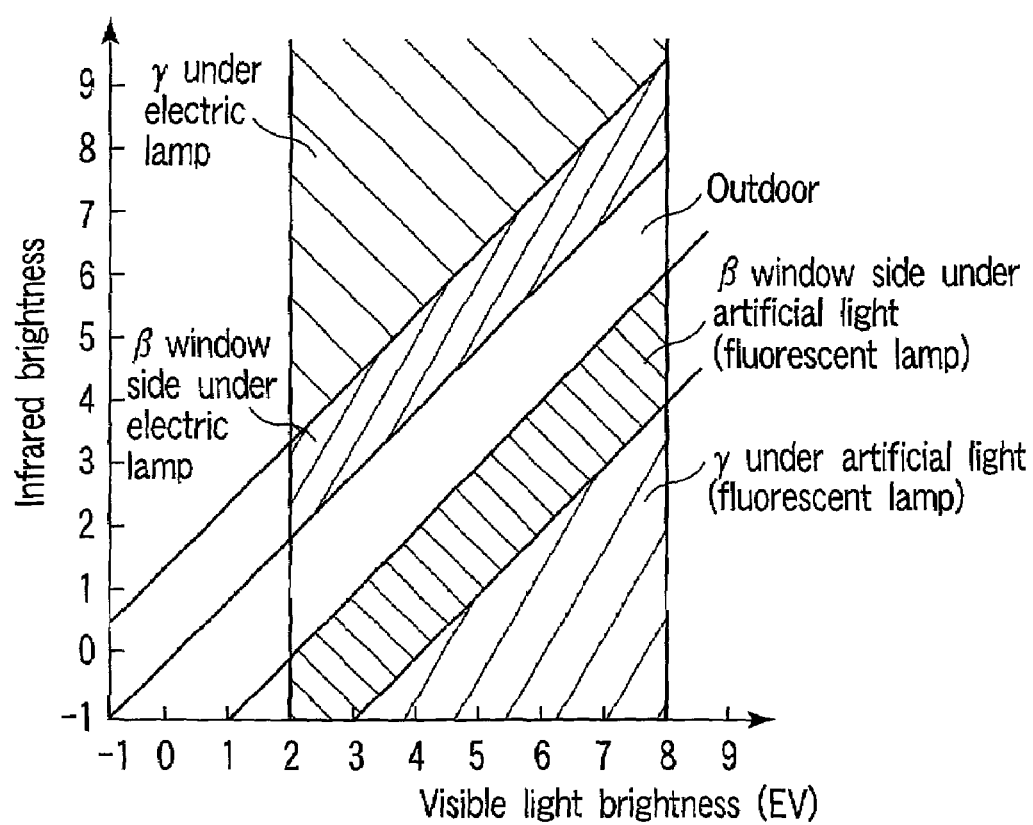
FIG. 11 is an illustrative drawing showing determination criteria for determining the likeliness of visible light, infrared light and artificial light source.

Here in detail, FIG. 11 shows a determination criteria for determining the likeliness of visible light, infrared light and artificial light source. The visible light brightness (EV) is taken on the graph horizontal axis, and the infrared brightness on the vertical axis, respectively.

A case where the visible light brightness is 2EV or more is an essential condition allowing the determination, if it is 2EV or less, as it is dark, the electric flashing light has a tint substantial equal to the Sun, making the color correction unnecessary.

Satisfying the essential condition, in the ratio of visible light and infrared light, the natural light (sunlight) has visible light and infrared light in a range (outlined area in the drawing) as shown by "outdoors" in the graph. Upper and lower two β areas at both sides of this outdoor area correspond respectively to the window side under the fluorescent lamp or under the electric lamp. Besides, the γ area can be determined to be under the artificial light (particularly under the electric lamp) for more infrared light, and it can be determined to be under the fluorescent lamp for more visible light. Thus, the determination is made considering the visible light brightness and the infrared brightness globally.

Figure 12A:
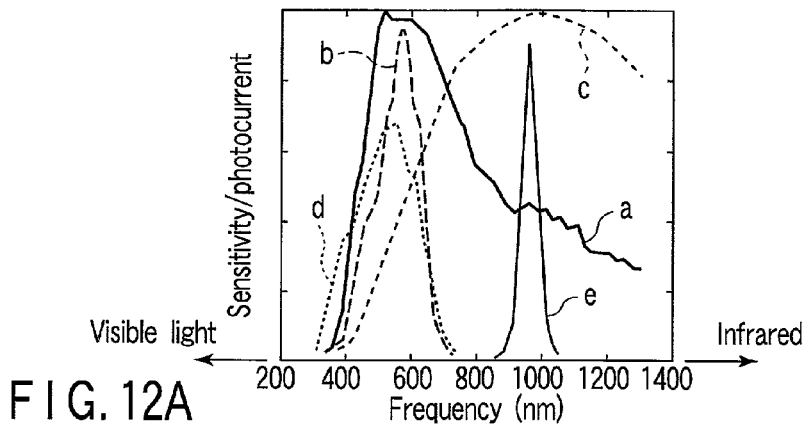
FIG. 12A to FIG. 12D show relationships between the wavelength component (color component) of natural light (sunlight) and artificial light (fluorescent lamp, electric lamp) and the photosensitivity of a man and various sensors, FIG. 12A being a graphic showing outputs of sunlight, a fluorescent lamp and an electric lamp, human view sensitivity and the spectral sensitivity of a visible light sensor and an infrared sensor.

FIG. 12A to FIG. 12D show relationships between the wavelength (color) component of natural light (sunlight) and artificial light (fluorescent lamp or electric lamp) and the photosensitivity of a man and various sensors. In FIG. 12A, the graph curve "a" shows output of sunlight, graph curve "b" substantial output of fluorescent lamp, graph "c" output of electric lamp, graph "d" human view sensitivity and spectral sensitivity of a visible light sensor and graph "e" spectral sensitivity of infrared sensor, respectively.

For the purpose of determination of the kind of light source, the difference about the sensitivity of visible light sensor and infrared light sensor for each kind of illumination light. For this sake, for example, it is necessary to decide the spectral sensitivity ratio of the concerned sensor. There, graphs in FIG. 12B, FIG. 12C and FIG. 12D show the spectral sensitivity ratio of visible light sensor and infrared sensor under the fluorescent lamp, under the sunlight, and under the electric lamp, respectively.

Figure 12B:
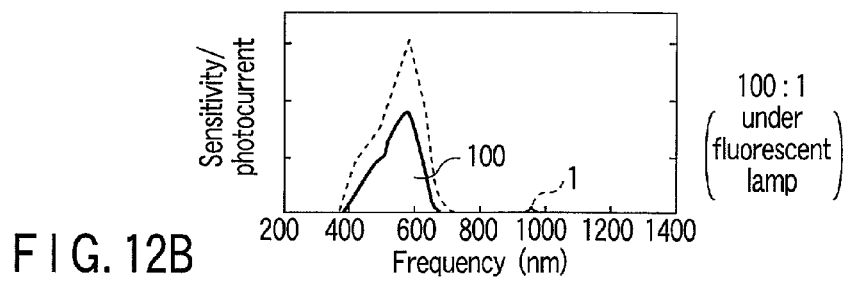
Figure 12C:
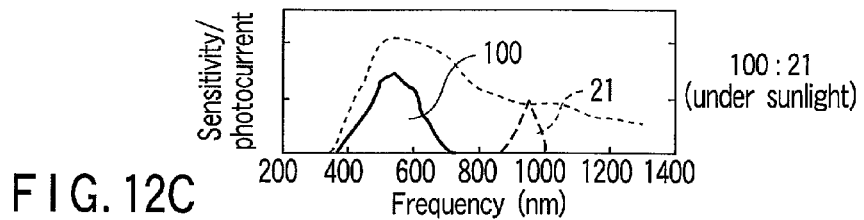
Figure 12D:
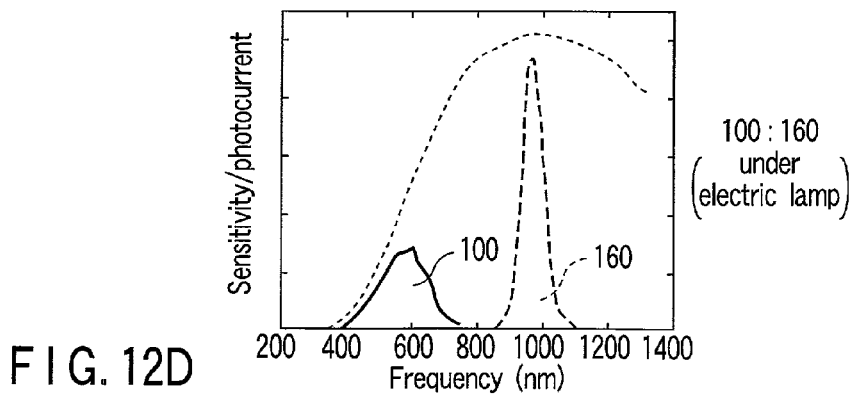

According to FIG. 12B, respective sensor outputs are calculated by multiplying the output of fluorescent lamp with the spectral sensitivity of visible light sensor and infrared sensor.

When output of visible light sensor:output of infrared sensor=100:1 or less if it is represented as brightness=$\log_2$ (sensor output)

visible light brightness: infrared brightness=$\log_2$ (100):0. Namely, 100:1, and this sensor output hardly includes infrared light.

According to FIG. 12C, respective sensor outputs are calculated by multiplying the output of sunlight with the spectral sensitivity of visible light sensor and infrared sensor.

When output of visible light sensor:output of infrared sensor=100:21, assuming the brightness=$\log_2$ (sensor output), similarly as mentioned above, visible light brightness:infrared brightness=$Lo_2$ (100):$\log_2$ (21), namely, 100:21.

Similarly, according to FIG. 12D, respective sensor outputs are calculated by multiplying the output of an incandescent lamp with the spectral sensitivity of visible light sensor and infrared sensor. In short, it is 100:160.

This permits the determination of fluorescent lamp, sunlight and electric lamp by the brightness difference of visible light brightness and infrared brightness. It should be appreciated that it is necessary to consider the reflectance of the object, and the accuracy can further be improved by deciding the threshold based on the reflectance for each wavelength of an ordinary object (face, clothing, or the like).

Thus, according to the embodiment, as the correction state is changed by the artificial light source (fluorescent lamp) likeliness determined by the visible light and the infrared light, a correction smoother than the correction by a simple determination of the kind of fluorescent lamp only with R, G, and B signals as in the prior art becomes possible.

In short, as the reliability of determination is high, the achromatic color range can be optimized securely according to the "artificial light source likeliness (degree of occupation of artificial light)". Consequently, color mixtures can be corrected properly even at the window side under the artificial light or others, allowing realization of a camera excellent in color rendering. In short, if a light source can be determined to be an artificial light source based on the visible light photometric value and infrared photometric value, a digital camera capable of white balance that would correct optimally the color mixture of that artificial light can be provided.

(Modification)

Next, modifications according to the embodiment will be described along with FIG. 13 to FIG. 16B. For instance, in this embodiment, a modification is exerted so as to perform the determination minutely in a so-called "fuzzy inference" manner, in the determination processing of the light source type mentioned above.

Figure 13:
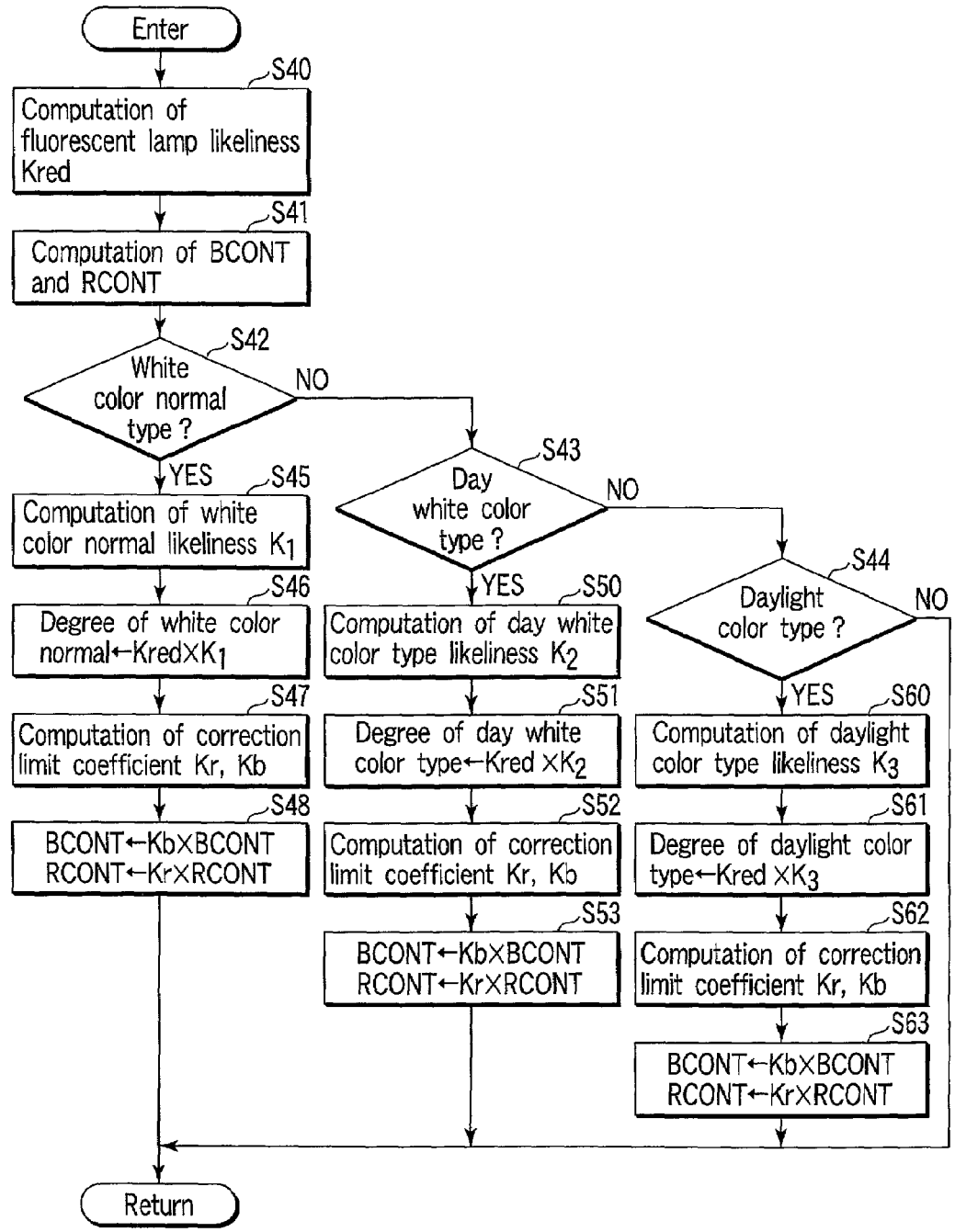
FIG. 13 is a flowchart showing partially control procedures for determining in a fuzzy inference manner as variant of FIG. 9.

Therefore, the step portions corresponding to the "*" mark in the flowchart in FIG. 9 of the embodiment mentioned above are substituted with the following processing steps S40 to S63 as shown in FIG. 13. In V short, the fluorescent lamp likeliness (K red) is computed (S40) and, moreover, the value of control values R CONT and B CONT are calculated respectively (S41). At this moment, correction quantities B CONT and R CONT that make the color differences B–Y and R–Y 0 are computed.

As there are different types for the fluorescent lamp, decision processing is performed concerning respective types. For example, from step S42, white color normal type or not is decided (S42), and in the case of no, day white color or not is decided in step S43 (S43), and in the case of no, daylight color type or not is decided in step S44 (S44). In the case of no, it returns.

Then, after the aforementioned respective decision, corresponding respective ". . . likeliness" are computed as a K red value (K1, K2, K3) (S45, S50, S60), and each ". . . degree" is computed with K red ×K1, ×K2, and ×K3 (S46, S51, S61).

Furthermore, correction limit coefficients (Kr, Kb) is computed (S47, S52, S62).

Besides, the correction limit coefficients (Kr, Kb) are multiplied by the control values R CONT and B CONT respectively, to make them corrected control values respectively (S48, S53, S63). Thereafter, it returns.

To be more specific, a description about the aforementioned series of calculation processing will be supplemented.

Figure 14:
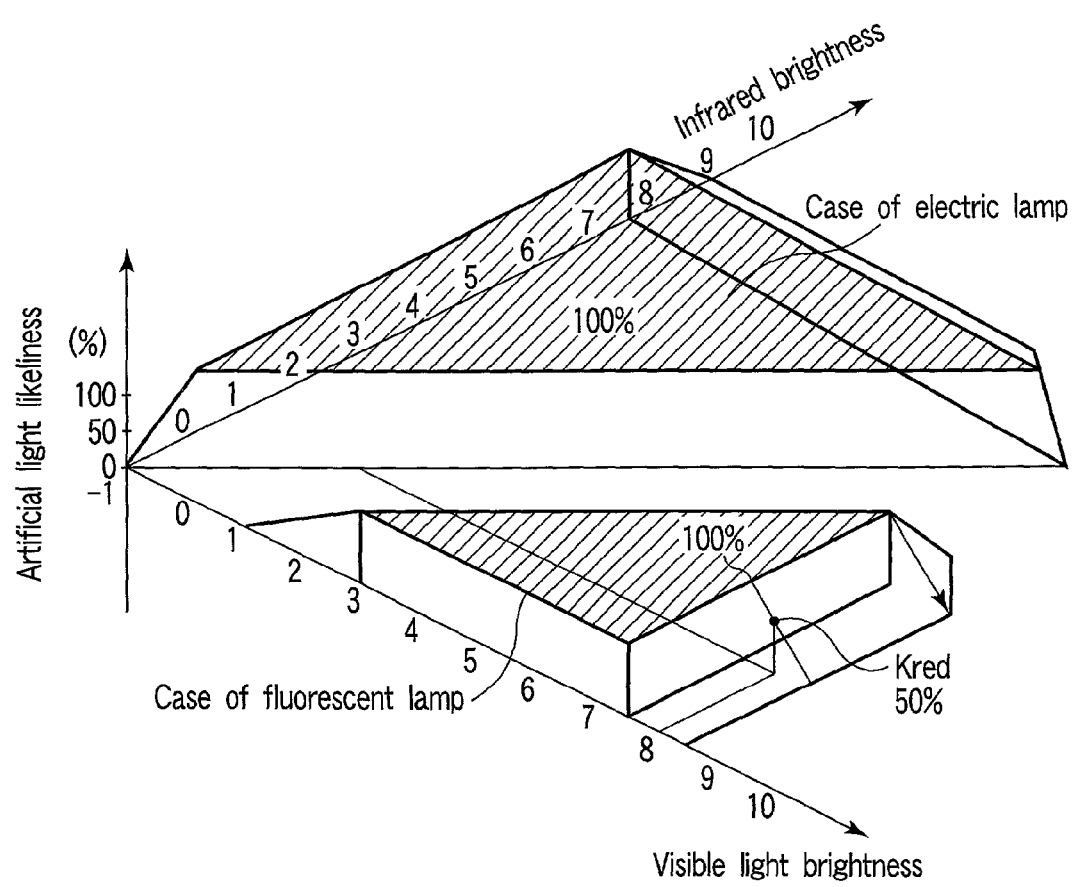
FIG. 14 is a graph representing criteria for calculating the "artificial light source likeliness" K red.

For example, in case of computing K red representing the artificial light (fluorescent lamp) likeliness, it will be executed referring to the graph (three-dimensional graph) shown in FIG. 14. The visible light brightness is taken on the graph horizontal axis, the infrared brightness on the vertical axis similarly as FIG. 11 mentioned above, and the degree of artificial light source likeliness (%) on the height axis respectively.

In FIG. 14, ". . . likeliness" by the ratio of visible light brightness and infrared light brightness based on FIG. 11, the portion which is 100% in two area ranges of "fluorescent lamp likeliness" or "electric lamp likeliness" as artificial light source likeliness is represented by hatching.

Figure 15:
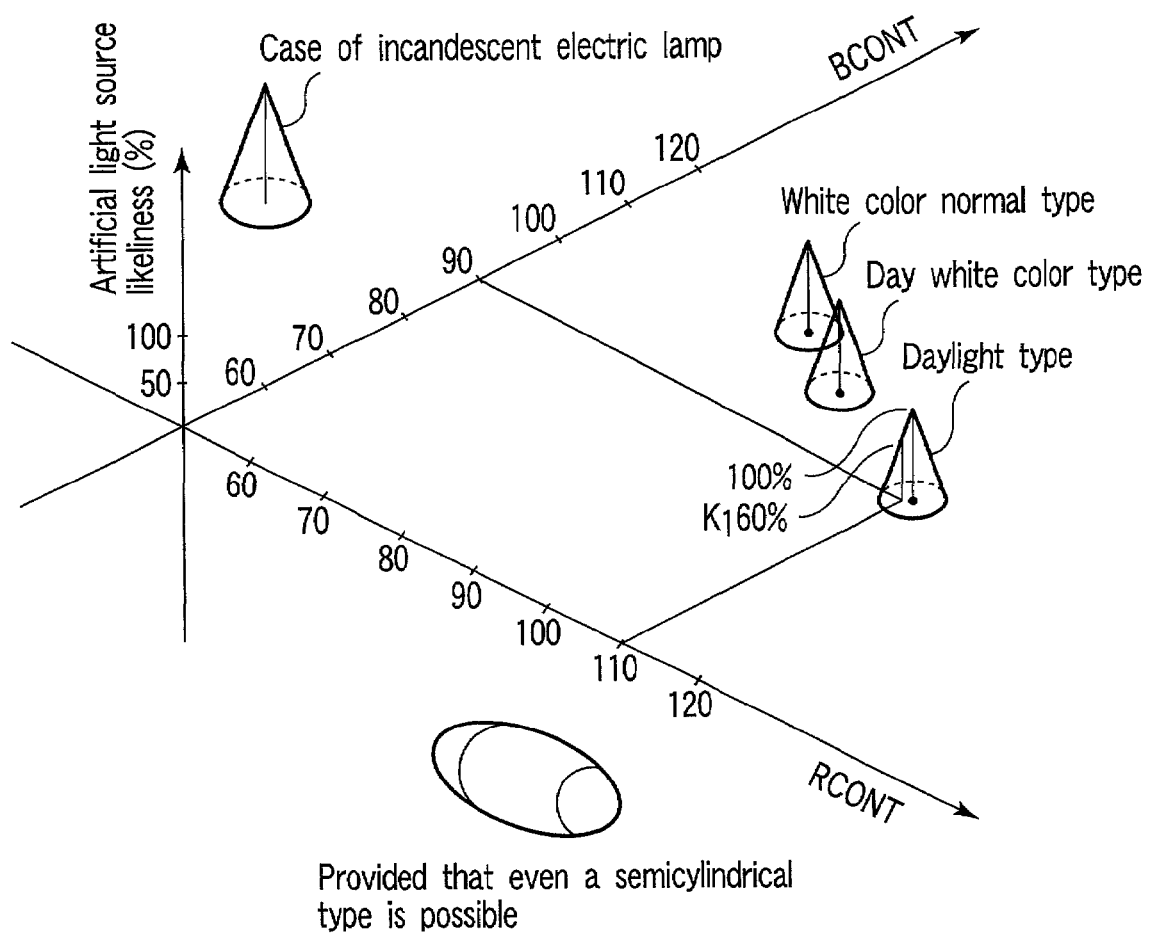
FIG. 15 is a graph representing the kind of artificial light source, and the relationship of control values B CONT, R CONT for correction for each kind of light source.

Besides, in FIG. 15, K red showing the type of light source and furthermore how much it is likely to be an artificial light source, in short, a criteria for computing three Kn's (n=1, 2, 3) is represented by a three-dimensional graph. The correction quantities B CONT and R CONT are taken on the horizontal axis and the vertical axis of the graph respectively, and further, the degree of artificial light source likeliness (%) is taken on the height axis.

Three cones at the right represent three types of fluorescent lamp, and a left upper cone represent a while color electric lamp. For instance, in case of a fluorescent lamp of the kind of daylight color type, the control value B CONT for the sake of correction is 90, R CONT is 110, and "fluorescent lamp likeliness" K1 is 60% corresponding to the cone height as illustrated.

Here, thought the type of fluorescent lamp is represented into a cone, it may be hemispheric or "semicylindrical" (namely, high in the middle with semicircular section) conforming to the characteristics of the light source.

Like this, in the case where the light source is particularly a fluorescent lamp, following the flowchart of FIG. 13, first in the former sate of processing procedures (S40, S41), Kn (n=1, 2, 3) representing the likeliness of which type of fluorescent lamp is computed, correction quantities B CONT and R CONT are computed and thereafter, in the middle stage (S42 to S44), degree of white color fluorescent lamp (K1), degree of day white color type (K2) and daylight color type degree (K3) are computed respectively for three types.

Thereafter, in respective one of the latter stage of processing procedures (S45 to S47, S50 to S52, S60 to S62), correction limit coefficients Kr and Kb are computed, for each of these degree of white color fluorescent lamp, degree of day white color type and daylight color type degree.

Figure 16A:
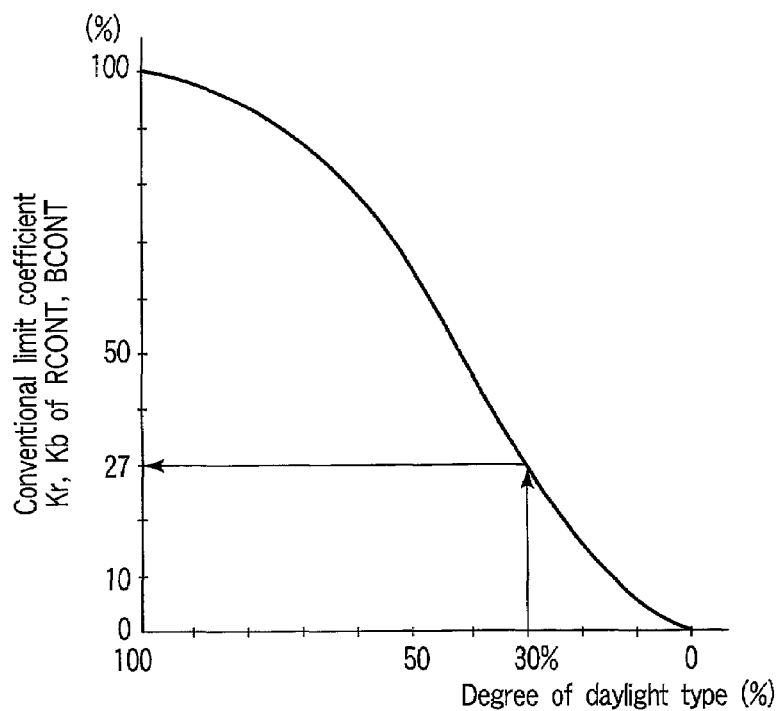
FIG. 16A and FIG. 16B represent correction criteria for the case of a daylight color type fluorescent lamp, FIG. 16A being a graph showing the relationship between the daylight color type degree and a correction limit coefficient of control values B cont, R cont, and FIG. 16B an illustrative diagram showing the correction limitation during an object photographing applying the limit coefficient.

At the last of the processing procedures (S48, S53, S63), the correction coefficient is determined, from a graph illustrated, for example, in FIG. 16A, to limit the correction quantity.

Figure 16B:
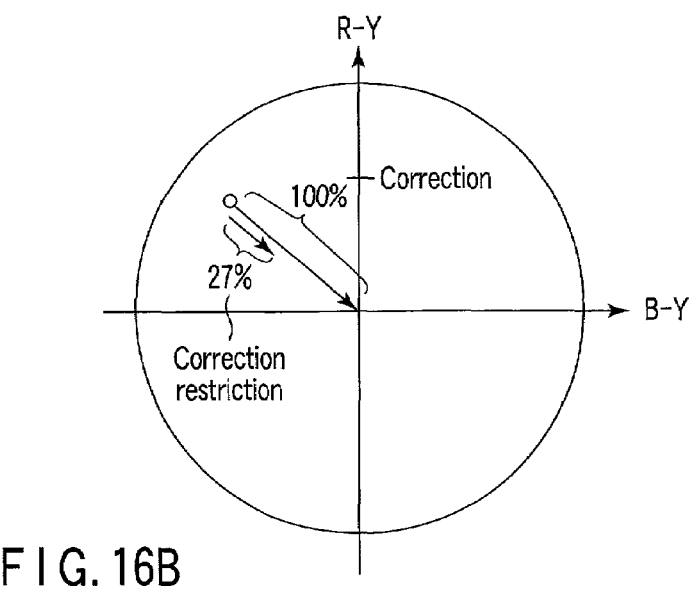

More in detail, in FIG. 16A and FIG. 16B, the daylight color type degree in case of daylight color type, and the correction limit at the time of computation are represented by graphs respectively. The curve graph of FIG. 16A teaches the relationship between the daylight color type degree and the correction limit coefficient. Coefficients Kr and Kb (27%) corresponding to the type degree thereof (daylight color type degree of 30%) are determined from the graph illustrated in FIG. 16A. And, as illustrated in FIG. 16B, the correction value is limited multiplying B CONT, R CONT by this correction limit coefficient.

In short, according to the pie chart of FIG. 16B, the degree of correction at the moment of object photographing to which this limit coefficient is applied would otherwise correct 100% if it were not for the limit. However, in this case, the correction is limited to 27% because there is a limit.

It should be appreciated that, other than the case of illustrated daylight color type, white fluorescent lamp or day white color type or the like can be processed by similar procedures.

In such a modification, as the correction state is modified by the fluorescent lamp likeliness determined by the visible light and infrared light, a correction "smoother (not extreme)" than the prior art becomes possible. Particularly, in case of correcting the primary color signal according to the kind of light source, an excessive correction can be prevented by applying an optimal restriction (limit) under a more precise determination. As a result, for example, discoloration of background, or excessive correction of a main object in the direction of a complementary color can be prevented.

(Other Modifications)

In addition to this, various modifications can be realized without departing from the subject matter of the present invention. For example, the type of light of the fluorescent lamp to be discriminated is not limited to the aforementioned three, but it can be modified for allowing to add easily incandescent light of the electric lamp, light of the three-wavelength type fluorescent lamp, or type of light source.

Otherwise, the evening sun other than artificial light source can be corrected. Moreover, electric lamp or the like may be corrected with further more kinds.

And, these variants allow to expect effects equal or superior to the embodiment.

(Effects of Invention)

Hereinabove, the description has been made based on the embodiments, and according to the present invention, a camera capable of white balance correction that would correct color mixture of fluorescent lamp, by determining whether or not the light source is an artificial light source, by a method based on the visible light photometric value and the infrared light photometric value, independently of the color of an object.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera capable of white balance correction comprising:
    an image pickup optical system;
    an image sensor for receiving light from an object through this image pickup optical system;
    a three-primary-color detection section for detecting three-primary-color signals based on the output of the image sensor;
    a matrix processing section for calculating two color difference signals from the three-primary-color signals;
    a visible light brightness detection section for detecting visible light brightness by the output from said three-primary-color detection section or by a photometric section having as an automatic camera;
    an infrared light detection section for detecting luminosity of infrared light; and
    an artificial light detection section for calculating the ratio of artificial light and natural light from the output of said visible light brightness detection section and the output of said infrared light detection section,
    wherein a correction range for performing the white balance correction is obtained based on the ratio of artificial light and natural light calculated by said artificial light detection section, and the white balance correction is performed when the two color difference signals are within said correction range.

2. A camera capable of white balance correction according to claim 1, further comprising:
    a determining section for determining the kind of artificial light source from said two color difference signals; and
    a correspondence section for calculating a correction limit value to make correspondence based on the determination result of the kind of artificial light source,
    wherein the quantity of white balance correction of said two color difference signals is limited by said correction limit value.

3. A camera capable of white balance correction according to claim 1,
    wherein said infrared light detection section can also be used as a remote control light detection section for detecting a light emitted from a remote controller for remote-controlling the camera.

4. A camera capable of white balance correction comprising:
    an image pickup optical system;
    an image sensor for receiving an object light through the image pickup optical system;
    an RGB detection section for detecting R, G, and B signals corresponding to three primary colors from said image sensor;
    a matrix processing section for calculating a brightness signal (Y) and color difference signals (R−Y, B−Y) from the R, G, and B signals;
    a visible light brightness detection section for detecting visible light brightness by the output of said RGB detection section or by a photometric section comprised in a separate element;

an infrared light detection section for detecting infrared light; and an artificial light detection section for calculating the ratio of artificial light and natural light from the output of said visible light brightness detection section and the output of said infrared light detection section, wherein a correction range for performing the white balance correction is obtained based on the ratio of artificial light and natural light, and the white balance correction is performed when the color difference signals (R–Y, B–Y) are in said correction range.

5. A camera capable of white balance correction according to claim 4, wherein an RGB correction corresponding to the fluorescent lamp light is performed when the light source is determined to be a fluorescent lamp based on a visible light photometric value and infrared photometric value.

6. A camera capable of white balance correction according to claim 4, wherein said detection of infrared light serves also as detection mechanism for a remote controller.

7. A camera capable of white balance correction comprising:

an image pickup optical system;

an image sensor for receiving an object light through the image pickup optical system;

a three-primary-color detection section for detecting three-primary-color signals based on the output of the image sensor;

a matrix processing section for calculating two color difference signals from the three-primary-color signals;

a visible light brightness detection section for detecting visible light brightness by the output from said three-primary-color detection section or by a photometric section having as an automatic camera;

an infrared light detection section for detecting the lightness of infrared light; and an artificial light detection section for calculating the ratio of artificial light and natural light from the output of said visible light brightness detection section and the output of said infrared light detection section, wherein a correction range for performing the white balance correction is obtained based on the ratio of artificial light and natural light calculated by said artificial light detection section, and the white balance correction is performed based on the white balance correction quantity.

* * * * *